UNITED STATES PATENT OFFICE.

EMIL TEISLER, OF BORSDORF, GERMANY.

PROCESS OF PURIFYING GRAPHITE.

SPECIFICATION forming part of Letters Patent No. 651,537, dated June 12, 1900.

Application filed December 8, 1899. Serial No. 739,702. (No specimens.)

*To all whom it may concern:*

Be it known that I, EMIL TEISLER, doctor of chemistry, a subject of the King of Saxony, residing at Borsdorf, near Leipsic, in the Kingdom of Saxony, German Empire, have invented an Improved Process of Purifying Graphite, of which the following is a specification.

If fluoric acid be allowed to act on impure graphite, fluorides of the mineral impurities contained in the graphite are formed. According to Dammer, *Handbook of Inorganic Chemistry*, vol.2, page 267, these mineral constituents consist of silicic acid, alumina, iron, lime, magnesia, and alkalies. The fluorides formed are partly easily soluble and partly insoluble or only soluble with difficulty. To the latter two groups belong the fluorides of lime and magnesia, also the silicium fluoride of the alkalies. Moreover, fluoride of aluminium only dissolves in a large excess of acid, and even then often only incompletely, as is shown by the existence of alumina in ashes of graphite exhausted with fluoric acid. It is possible that in such cases the aluminium fluoride is combined with the fluorides of the alkalies into cryolite, which, as is well known, only dissolves with difficulty in acids. The varying solubility of the oxides of alumina of various origins in fluoric acid causes us to form the conclusion that the alumina of graphite ashes has a varying solubility in fluoric acid. The quantity of the insoluble fluorides is unequal in different substances and varies from ten to fifty per cent. of the total impurities originally existing in the graphite. These fluorides are dissolved by being decomposed by means of various mineral acids or acid salts. Thus fluoride of aluminium dissolves in hydrochloric and sulphuric acids and solutions of acid sulphates, fluoride of magnesium, cryolite, and fluo-silicic alkalies in sulphuric acid. In practice, for the purification of graphite only sulphuric acid and bi-sulphate can come into question, because of technical and commercial reasons, as less difficulties in the way of apparatus have to be overcome, and all waste products may be easily employed or used up in actual working. I therefore in my application only lay stress on the use of sulphuric acid and acid alkali sulphate for the after treatment of graphite preliminarily purified by means of fluoric acid. It is also somewhat immaterial whether I employ dilute sulphuric acid or solutions of bi-sulphates or concentrated sulphuric acid and deliquescent bi-sulphate. The effect of the treatment is almost the same and is only favorably influenced by the presence of alkaline sulphates, probably owing to the possibility of the formation of easily-soluble double salts, such as sulphate of calcium and soda. An excess of the solvent must exist, and this is already required in order to obtain a good mixture of the sulphate with the graphite.

Whether it be better to employ dilute or concentrated acid depends on the subsidiary circumstances—for instance, whether it be desired to immediately remove the fluoric acid released from out of the reaction mixture or not. In the first case concentrated acid is employed, whereby the fluorides released immediately escape in a gaseous form, while they remain dissolved otherwise in the dilute sulphuric acid, and are then only expelled therefrom during the concentration. It may appear self-evident that a subsequent treatment of the graphite with sulphuric acid will diminish considerably the amount of ash contained in several varieties of graphite, while the preliminary treatment of the same graphites is almost without effect. If sulphuric acid of 60° Baumé be allowed to act at boiling temperature on burned ferruginous clay, which is composed similarly to the ashes of graphite, hardly two per cent. of the substances of the clay is dissolved. By means of fluoric acid, however, over eighty per cent. is immediately dissolved, considerable heat being developed, and by the succeeding further treatment with dilute or concentrated sulphuric acid a further fifteen per cent. is dissolved. The chemical constitution of the molecules of the clay must first be broken up, and this is effected most thoroughly by means of fluoric acid.

The simultaneous treatment of graphite with fluoric and sulphuric acid or with fluorides and sulphuric acid in excess is inadvisable for both technical and practical reasons—*i. e.*, for technical reasons because there is no cheap material for making vessels which can withstand the combined action of dilute fluoric acid, sulphuric acid, and fluosilicic acid, and for practical reasons because we are forced to employ such fluorides as yield with sulphuric acid soluble sulphates. The cheapest of these are the alkaline fluorides; but these, with the aid of the fluo-silicic acid present, form the fluo-silico alkalies, which are so difficult to dissolve and decompose, and the technical effect of the same would also thus be less. The result of this explains why I lay stress on the subsequent or secondary treatment with sulphuric acid or acid sulphates of graphite previously purified with fluoric acid.

Having now described my invention, what I desire to secure by Letters Patent of the United States is—

1. The process of purifying graphite, consisting of first treating the graphite with dilute fluoric acid, then exposing it to the action of sulphuric acid, and finally washing it with water.

2. The process of purifying graphite, consisting of first treating it with fluoric acid, then exposing it to the action of sulphuric acid and acid sulphates, and finally washing it with water to remove the resultant salts.

In witness whereof I have hereunto set my hand in presence of two witnesses.

EMIL TEISLER.

Witnesses:
FRANZ EMIL VELL,
RICHARD EMIL HACHBERG.